O. WAIBEL.
TRAP FOR WASTE PIPES.
APPLICATION FILED APR. 2, 1908.

904,286.

Patented Nov. 17, 1908.

Witnesses
Albert Popkins
Grace P. Brereton

Inventor.
Otto Waibel
By Sturtevant & Mason
Attorneys

UNITED STATES PATENT OFFICE.

OTTO WAIBEL, OF SINGEN, GERMANY.

TRAP FOR WASTE-PIPES.

No. 904,286.　　　　Specification of Letters Patent.　　　Patented Nov. 17, 1908.

Application filed April 2, 1908. Serial No. 424,699.

*To all whom it may concern:*

Be it known that I, OTTO WAIBEL, a citizen of the German Empire, residing at Singen, in the Grand Dukedom Baden, Empire of Germany, have invented certain new and useful Improvements in Traps for Waste-Pipes; and I do hereby declare the following to be a full, clear, and exact description of the invention, such as will enable others skilled in the art to which it appertains to make and use the same.

This invention relates to a stench trap such as may be employed for waste pipes of all kinds. The improved stench trap belongs to the class termed flange siphon traps and is characterized more particularly by its practical construction. It is provided at its inlet with a nozzle shaped projection or the like which opens into a container which may be suitably removed. This container or receiver is immediately filled with liquid in which the nozzle is immersed, and remains constantly filled with liquid so that a permanently secure water seal is obtained. This improvement also has the advantage that any stoppage or the like may be overcome in a simple and convenient manner as the container or receiver is easily removable. This container or receiver also enables the stench trap to be used in winter, as its container or receiver may be replaced by a simple wall or tongue which is not formed as a vessel. The stench trap is thereby converted into a continuous pipe so that it is prevented from being frozen up during winter.

Figure 1:
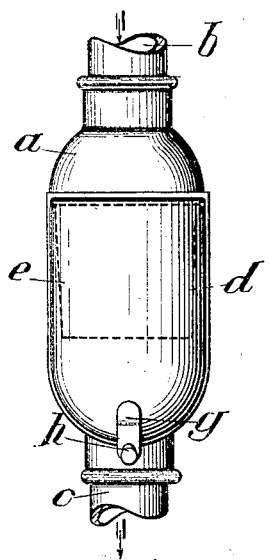
Figure 2:
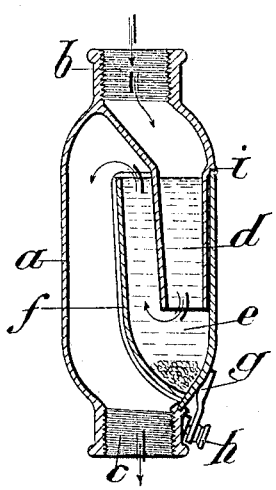
Figure 3:
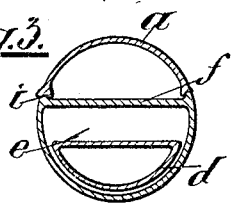
Figure 4:
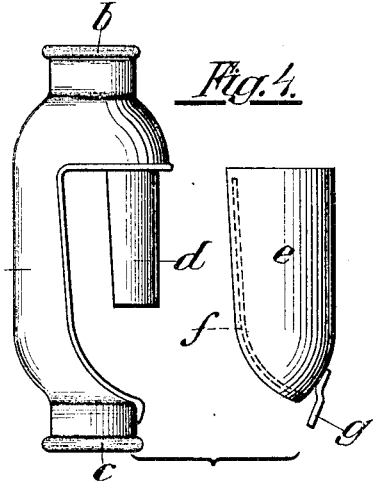
Figure 5:
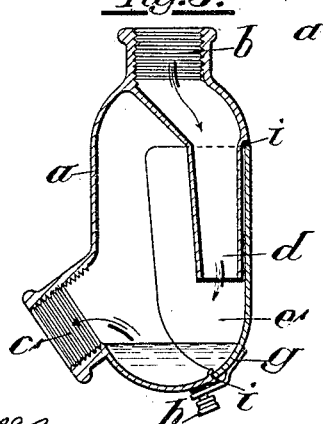

The invention is shown in several forms of construction, as examples, in the accompanying drawings, in which, Figure 1 is a front view; Fig. 2, a vertical axial sectional view at right angles to Fig. 1; Fig. 3, a cross sectional view of Fig. 1; Fig. 4, an elevation of the trap when taken apart; and Fig. 5, an axial vertical sectional view of a second form of construction.

The stench trap according to this invention consists of a casing $a$ which is provided with an inlet $b$ and an outlet $c$, and also with an arrangement for connecting it with the drain pipes. Now by this invention the inlet $b$ has a nozzle shaped projection $d$ which is immersed in a kind of vessel $e$ which also serves for closing the casing $a$. This container $e$ is removable and the edges of its front wall engage in corresponding grooves running round the casing $a$ in which india-rubber packing $i$ or the like may be provided for the purpose of forming a tight joint. In order to secure the container $e$ to the casing $a$ it is provided with one or more lugs $g$ for instance and with one or more fastening screws $h$, after the release of which the container $e$ may be taken off. If there is reason in winter to fear the freezing of the water contained in the vessel $e$ the latter may be replaced by a simple wall or tongue $e'$ (Fig. 5) without any alteration in the shape of the stench trap being necessary. Then instead of the casing $a$ shown in Figs. 1–4, a casing with a lateral discharge $c'$ may be preferably employed, the lower part of the casing $a$ then serving as a second trap. This part may then be conveniently cleaned through the aperture formed after the removal of the wall or tongue $e'$.

I declare that what I claim is:—

1. In a stench trap, a casing formed of two sections, the main section having an inlet connection at its upper portion, and an outlet connection at its lower portion, one side wall being cut away between the two connections, and having also a depending nozzle, and a second section removably secured to the main section and surrounding the nozzle and forming when in position the opposite side wall of the trap.

2. In a stench trap, a casing formed of two sections, the main section having an inlet connection at its upper portion and an outlet connection at its lower portion, one side wall of the main section being cut away between the two connections and the edge of such wall having a continuous groove for the reception of the edge of the second or removable section, and a locking means for holding the sections of the casing together the main section having a depending nozzle extending below the upper edge of the second section, whereby a seal for the lower end of the nozzle is formed.

In testimony whereof I affix my signature, in presence of two witnesses.

OTTO WAIBEL.

Witnesses:
　JEAN GULDEN,
　HERM. HOPPE.